(12) United States Patent
Visinoni et al.

(10) Patent No.: US 11,629,793 B2
(45) Date of Patent: Apr. 18, 2023

(54) VALVE

(71) Applicant: MILESTONE S.r.l., Sorisole (IT)

(72) Inventors: Francesco Visinoni, Mozzo (IT);
Matteo Minuti, Brignano Gera d'Adda (IT); Michele Bellini, Villongo (IT)

(73) Assignee: MILESTONE S.r.l., Sorisole (IT)

( * ) Notice: Subject to any disclaimer, the term of this patent is extended or adjusted under 35 U.S.C. 154(b) by 0 days.

(21) Appl. No.: 17/090,175

(22) Filed: Nov. 5, 2020

(65) Prior Publication Data
US 2021/0148476 A1 May 20, 2021

(30) Foreign Application Priority Data
Nov. 20, 2019 (EP) .................................. 19210223

(51) Int. Cl.
*F16K 15/14* (2006.01)
(52) U.S. Cl.
CPC ........ *F16K 15/147* (2013.01); *F16K 15/1471* (2021.08); *Y10T 137/7882* (2015.04); *Y10T 137/7885* (2015.04)
(58) Field of Classification Search
CPC ............... F16K 15/147; F16K 15/1471; Y10T 137/7882; Y10T 137/7885
See application file for complete search history.

(56) References Cited

U.S. PATENT DOCUMENTS

| 3,621,876 A * | 11/1971 | Campbell ............. F16K 15/147 137/846 |
| 4,240,630 A | 12/1980 | Hoffman |
| 4,535,819 A | 8/1985 | Atkinson et al. |
| 5,010,925 A | 4/1991 | Atkinson et al. |

(Continued)

FOREIGN PATENT DOCUMENTS

| DE | 102018200254 A1 | 7/2019 |
| EP | 0863343 A2 | 9/1998 |

(Continued)

OTHER PUBLICATIONS

European Search Report issued in connection with the corresponding European application No. 1910223.4 dated May 7, 2020.

(Continued)

*Primary Examiner* — Kevin F Murphy
(74) *Attorney, Agent, or Firm* — The H.T. Than Law Group (57) ABSTRACT

The invention relates to a valve (1) for mounting to a surface (2) and for use in a flow path, which flows through said surface (2), for permitting flow in said flow path in a first direction and for preventing flow in said flow path in a second direction being opposite to the first direction. The valve (1) comprises: one or more ports (21) defined by a plurality of lips (22), wherein each lip (22) is resiliently deformable from a first position, in which the lips (22) are in contact with one another in order to close the respective port (21), to a second position, in which the respective port (21) is opened in order to permit flow in the first direction, and one or more contacting structures (30) arranged to mechanically contact the surface (2), when the valve is mounted to the surface (2), such that the one or more contacting structures (30) bias the lips (22) into the first position.

18 Claims, 4 Drawing Sheets

(56) References Cited

U.S. PATENT DOCUMENTS

| | | | |
|---|---|---|---|
| 5,105,848 A | 4/1992 | Kallenbach | |
| 6,092,551 A | 7/2000 | Bennett | |
| 7,037,303 B2 | 5/2006 | Beaufore et al. | |
| 9,173,430 B1 | 11/2015 | Harvell | |
| 2009/0159826 A1* | 6/2009 | Poulton | F16K 15/147 251/157 |

FOREIGN PATENT DOCUMENTS

| | | |
|---|---|---|
| JP | 2000046216 A | 2/2000 |
| JP | 2010270800 A | 12/2010 |
| JP | 2014190365 A | 10/2014 |

OTHER PUBLICATIONS

Machine translation of JP 2014190365 to Yutaka.
Machine translation of JP 2010270800 to Hakko Co.
Machine translation of JP 2000046216 to Kainuma.
Machine translation of DE 102018200254 to Audi AG.

* cited by examiner

Section B-B

Fig. 4

Section A-A

VALVE

FIELD OF THE INVENTION

The present invention relates to a valve for permitting flow in a flow path in a first direction and for preventing flow in said flow path in a second direction, which is opposite to the first direction.

TECHNICAL BACKGROUND

A valve according to above-mentioned type may be a one-way valve, such as a duckbill valve. Such a valve can be used in many fields, such as automotive, industrial equipment, healthcare, etc. Typically, the valve or duckbill valve is an elastically deformable one-way valve for fluids, which comprises resiliently deformable lips for forming a port, e.g. in the form of one slit. The valve is normally biased towards a closed position, keeping the deformable lips into or in the closed position while the valve is in an idle state. When a pressure is applied to an inlet side of the valve, or when a mechanical mean pushes against the valve's lips from the inlet side, the resilient lips move apart and the port is opened, allowing the passage of the fluid in the first direction. When a pressure is not applied at the inlet side, or when a pressure at an outlet side is greater than a pressure at the inlet side, i.e. when a pressure is applied to the outlet side, the port is closed due to the elasticity of the deformable lips that are forced back into their closed position by spring forces or restoring forces due to the resiliency of the deformable lips material. Consequently, the valve prevents that a fluid can flow in the second direction, which is opposite to the first direction.

The valve may be also a type of valve similar to the duckbill valve, e.g. named cross-slit valve. The cross-slit valve typically comprises a pair of intersecting duckbill-like structures oriented perpendicular to each other. Cross-slit valves are sometimes named as double duckbill valve, for example in U.S. Pat. No. 7,037,303 B2.

The valve may have the shape comprising multiple duckbill-like structure, for example named cuspic valve. Examples of such valves, i.e. duckbill valve, double duckbill valve, cross-slit valve and cuspic valve, are disclosed in EP0863343B1.

In the context of this invention, the term "valve" is used to include, in particular, all these kinds of valves, i.e. duckbill valve, double duckbill valve, cross-slit valve and cuspic valve.

A common flaw of the above-mentioned valve is the tendency, over time, to lose the biasing to the closed position that is essential for preventing fluid leakage, in particular for preventing a flow of liquid in the second direction. In fact, the resilient force that keeps the lips of the valve touching or contacting each other is quite weak and can become weaker due to ageing or wear. The result is that the valve becomes leaky, since the lips tend to remain open.

For overcoming this drawback when such valves are mounted in pipes or in a housing, an additional three may be applied to the side of the valve in a direction perpendicular or oblique in respect of the flow path. The lips of the valve can thus be kept touching each other, as proposed, for example, in U.S. Pat. Nos. 5,010,925 A, 4,535,819 A, 6,092,551 A. However, for keeping the valve biased in a closed position, these solutions require the additional force (other than the resiliency of the lips) to be substantially perpendicular to the flow path. This makes them particularly unsuitable for being used in a flow path, which flows through a surface, such as a flat surface extending perpendicular to the flow path, e.g. of a lid or any other separating structure. Namely, applying this additional force requires this force to be almost parallel to said surface.

Therefore, it is an object of the present invention to provide a valve, which can effectively prevent leakage, when used in a flow path, which flows through a surface.

These and other objects, which become apparent upon reading the following description, are solved by the subject matter of the independent claims. The dependent claims refer to preferred embodiments of the invention.

SUMMARY OF THE INVENTION

According to the invention, a valve for mounting to a surface and for use in a flow path, which flows through said surface, and for permitting flow in said flow path in a first direction and for preventing flow in said flow path in a second direction being opposite to the first direction, is provided. The valve comprises: one or more ports defined by a plurality of lips, wherein each lip is resiliently deformable from a first position, in which the lips are in contact with one another in order to close the respective port, to a second position, in which the respective port is opened in order to permit flow in the first direction, and one or more contacting structures arranged to mechanically contact the surface, when the valve is mounted to the surface, such that the one or more contacting structures bias the lips into the first position.

Typically, a fluid flows along the flow path from an inlet side of the valve and along the first direction to an outlet side of the valve. The fluid may be a liquid and/or a gas. The valve can therefore prevent that the fluid flows from the outlet side along the second direction to the inlet side. The contact between the lips in the first position is to be understood as a contact, which sealingly closes the respective port, e.g. by the lips engaging one another, thereby preventing a flow in the second direction.

When the one or more contacting structures mechanically contact the surface, the one or more contacting structures effect that an additional force is effected at the contacting interface between the lips of the respective port in the first position. The additional force is provided in addition to the restoring force at the contacting interface, which is effected due to the resiliency or elasticity of the lips. Thus, in case said restoring force of the lips is reduced, for example due to wear, the additional force effected by the one or more contacting structures still ensures that in the first position the lips still contact one another in order to close the port. Thereby leakage of the valve is effectively prevented by the shape of the valve.

The valve may be designed for being mounted to the surface being a substantially flat surface. For example, the surface is a surface of a support plate or a separating plate or a lid. Therefore, the flow path may be substantially perpendicular to the flat surface, e.g. perpendicular to a plane, in which the flat surface extends.

The one or more contacting structures may be arranged such that a force, which acts on the one or more contacting structures in response to the one or more contacting structures mechanically contacting the surface, is substantially perpendicular to the surface and/or substantially parallel to the flow path. Therefore, the contacting structures can effectively bias the lips into the first position, thereby effectively preventing leakage of the valve. For example, the contacting structures can be arranged such that the respective force acting on each of the contacting structures effects a moment, which in turn biases the lips into the first position, i.e. effects the additional force at the contacting interface between the respective lips.

The one or more contacting structures may be arranged to be displaced upon Mechanically contacting the surface. During mounting the valve to the surface, said displacement takes place relative to the surface, e.g. by sliding along the surface. In the final position of this displacement, each of the one or more contacting may at least partially extend parallel to the surface. Thereby, a very simple design is provided for effectively biasing the lips into the first position. Preferably, said displacement of the one or more contacting structures is such that, when viewed in the direction of the flow path, the one or more contacting structures are displaced in a direction substantially perpendicular or oblique with respect to the respective port and/or lips (which form the respective port). This orientation of the displacement direction with respect to the extending direction of the respective port and/or lips, e.g. a longitudinal extending direction, effectively ensures that the lips remain in contact with one another in the first position. A displacement direction substantially perpendicular with respect to the (extending direction of) the respective port and/or lips is particularly advantageous, since then there is substantially no directional component of the displacement direction, which is parallel to the respective port and/or lips.

Advantageously, the one or more contacting structures are arranged around the flow path, preferably such that the one or more contacting structures are evenly distributed around the flow path. Therefore, the additional forces effected by the contacting structures can be effectively accumulated at the contacting interface between the respective lips. For example, the contacting structures may be arranged such that two contacting structures are provided on a same straight line and/or provided for one of the ports, for example such that, when viewed in the direction of the flow path, this port is provided between the respective two contacting structures. This effects a particular advantageous additional force in the contacting interface between the respective lips; leakage can thus be effectively prevented.

The one or more contacting structures may be resiliently deformable such that they are deformed upon mechanically contacting the surface in order to bias the lips into the first position. Thereby, when the contacting structures are resiliently deformed, the so effected restoring force biases the lips into the first position, and thus biasing the lips into the first position is easily achieved.

At least one, preferably each of the one or more contacting structures is a protrusion. Thus, a very simple design for the one or more contacting structures is provided.

The valve may comprise a mounting structure for mounting the valve to the surface. The mounting structure particularly provides a defined form and/or a sufficient mounting force for ensuring that the valve is properly mounted or fastened to the surface. The mounting structure may extent in a mounting structure plane. For example, a force effected by the mounting structure for fastening the valve to the surface may be oriented oblique or perpendicular to the mounting structure plane. As such, the mounting structure is preferably arranged for mounting the valve to the surface such that the mounting structure plane extends in the surface. In other words, the mounting structure plane is preferably the plane in which the surface is supposed to be placed. As such, the valve can be easily adapted to the surface.

When the valve is not mounted to the surface, the one or more contacting structures preferably extend beyond the mounting structure, for example beyond the mounting structure plane. This provides contacting structures, which can be displaced along a relatively long distance, when being mounted to the surface, thereby effectively biasing the lips into the first position.

The valve, preferably the mounting structure, may comprise a groove for receiving a side edge of the surface. The groove may be a circumferential groove, e.g. in the form of a closed ring. For example, the groove is smaller than the thickness of the surface such that by arranging the surface and/or the side edge in the groove, the groove is widened, thereby effecting a fastening force for mounting the valve to the surface. Additionally or alternatively, the valve, preferably the mounting structure, may comprise a flange designed to be brought into preferably planar contact with the surface when the valve is mounted to the surface.

The valve may comprise a sealing element for sealing an interface between the valve and the surface. This interface may be formed between the side edge of the surface and the valve. As such, it can be effectively prevented that a fluid flows from the outlet side of the valve via the interface between the valve and the surface, e.g. a gap between the valve on the one side and the surface and/or the side edge of the surface on the other side, to the inlet side of the valve—and vice versa.

The sealing element may be separately or integrally formed with the valve. Preferably, the mounting structure, e.g. the groove and/or the flange, comprises the sealing element.

The valve may be made of a deformable and/or elastic material, such as rubber or silicone, preferably Ethylene-Propylene Diene Monomer (EPDM), and/or a fluoroelastomeric material such as FPM (FKM) and/or FFPM (FFKM).

At least one and preferably each of the one or more ports may have a substantially elongate or slit-like form, i.e. may extend in substantially only one direction. In other words, when viewed in the direction of the flow path, each of the lips may have in the first position a substantially straight form for accordingly forming the substantially elongate or slit-like form of the respective port. This provides for a very simple design of the ports.

The ports may intersect one another and/or may be arranged in a substantially cross-like or star-like manner. In other words, in contrast to an embodiment in which the ports are independently provided to one another, the ports may thus form a single port of the valve, i.e. one port of the valve is defined by a plurality (e.g. two) pairs of lips. For example, the valve may comprise a pair of ports, which are accordingly arranged and/or intersect one another.

The valve may be a duckbill valve, a double duckbill valve, a cross-slit valve and/or a cuspic valve.

According to a further aspect of the invention, a supporting structure, such as a lid, is provided. The supporting structure comprises a surface, and a valve as described herein above. The valve is mounted to the surface for being used in the flow path, which flows through said surface, wherein the one or more contacting structures of the valve mechanically contact the surface such that the one or more contacting structures bias the lips into the first position.

The above-mentioned advantages with respect to the valve apply likewise to the supporting structure. For example, the supporting structure may be provided inside of a housing and/or a pipe, such that the flow path flows through the surface of the supporting structure. The supporting structure may be a lid, which is attached to a container body for—preferably sealingly—closing this container body.

BRIEF DESCRIPTIONS OF THE DRAWINGS

In the following, the invention is described exemplarily with reference to the enclosed figures, in which.

DESCRIPTION OF THE PREFERRED EMBODIMENTS

FIGS. 1-5 exemplarily show a valve 1 according to a preferred embodiment. In FIGS. 1-5, the valve 1 is in a non-mounted state. FIGS. 6 and 7 show examples, in which the valve 1 is mounted to a surface 2. In FIGS. 6 and 7, the valve 1 is thus in a mounted state.

As shown in FIGS. 6 and 7, the valve 1 is in general suitable for being mounted to or assembled with a surface 2, through which a flow path 3 flows. The flow path 3 may be defined by the valve 1. For example, the flow path 3 may be flush with an axis of the valve 1, such as the symmetrical axis of the valve 1. The surface 2 may comprise a through hole 4, which facilitates that the flow path 3 can flow through the surface 2. The through hole 4 is typically defined or delimited by a circumferential side edge of the surface 2. For example, the through hole 4 may have a substantially round form. In other examples, the through hole 4 may also have different forms, e.g. an elliptical, a polygonal, or a rectangular form.

The surface 2 may be a substantially flat surface. For example, the flat surface may be a section of a surface, which is not entirely flat. The surface 2 may be a surface of a lid 5, as shown in FIG. 6. As shown in FIG. 7, the surface 2 may be also provided inside of a housing or pipe. As such, the surface 2 may be the surface of a support and/or separating plate 6 and/or any other structure. The separating plate 6 may separate a first room from a second room of the housing or pipe. The flow path 3 is typically substantially perpendicular to the (flat) surface 2, i.e. perpendicular to a plane, in which the (flat) surface 2 extends. In other examples, the flow path 3 may be also orientated oblique with respect to the (flat) surface, however in any case not parallel to said surface 2.

In general, the valve 1 is provided for permitting a flow in the flow path 3 in a first direction and for preventing flow in said flow path 3 in a second direction, which is opposite to the first direction. The valve 1 therefore comprises an inlet side 11 and an outlet side 12. The first direction is then from the inlet side 11 to the outlet side 12, whereas the second direction is from the outlet side 12 to the inlet side 11. The first and second direction are therefore defined by and/or parallel to the flow path 3. The fluid, which flows along the flow path 3 is typically a liquid or gas. The valve 1 therefore facilitates that the fluid is prevented from flowing from the outlet side 12 to the inlet side 11. Thus, the valve 1 prevents leaking of the fluid. For example, the valve 1 can prevent that toxic gases flow from the outlet side 12 to the inlet side 11; on the inlet side 11 a human may be present, thereby effectively preventing that the human inhales these toxic gases. The valve 1 is therefore provided for only permitting flow in the first direction, thereby providing the function of a one-way valve.

Figure 4:
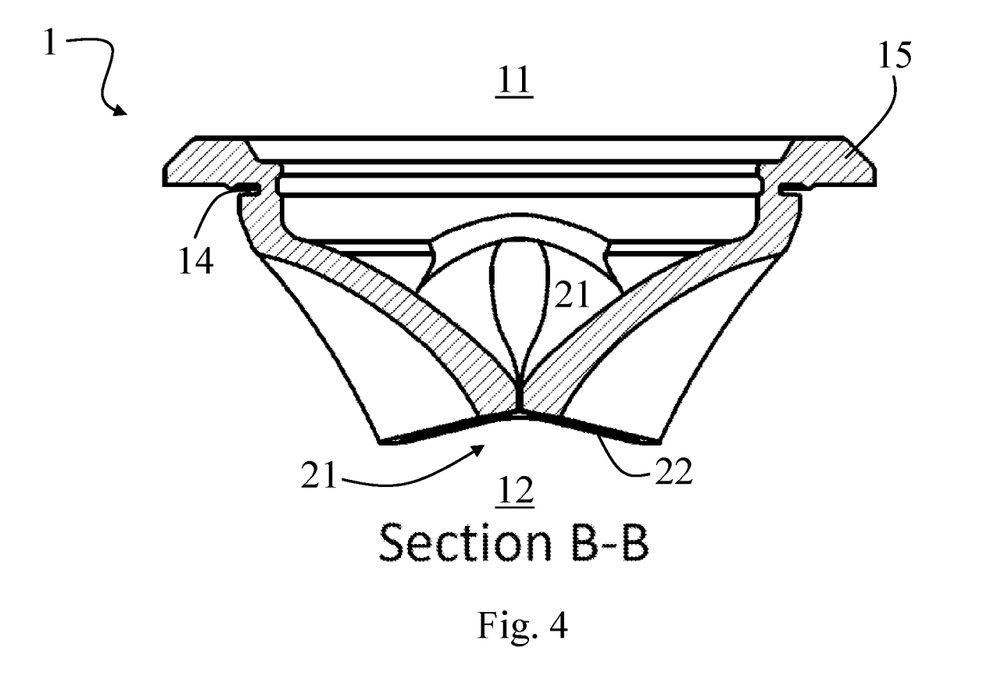
FIG. 4 is a schematic cross-sectional view of the valve shown in FIGS. 1-3, taken along the line B-B of FIG. 3.
Figure 5:
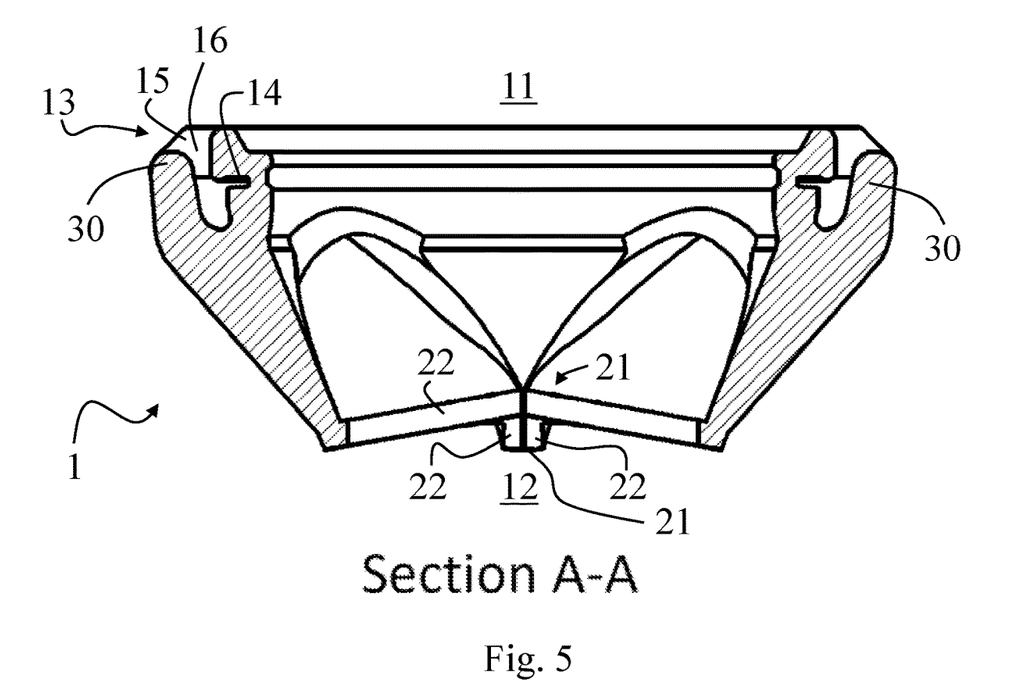
FIG. 5 is a schematic cross-sectional view of the valve shown in FIGS. 1-4, taken along the line A-A of FIG. 3.
Figure 6:
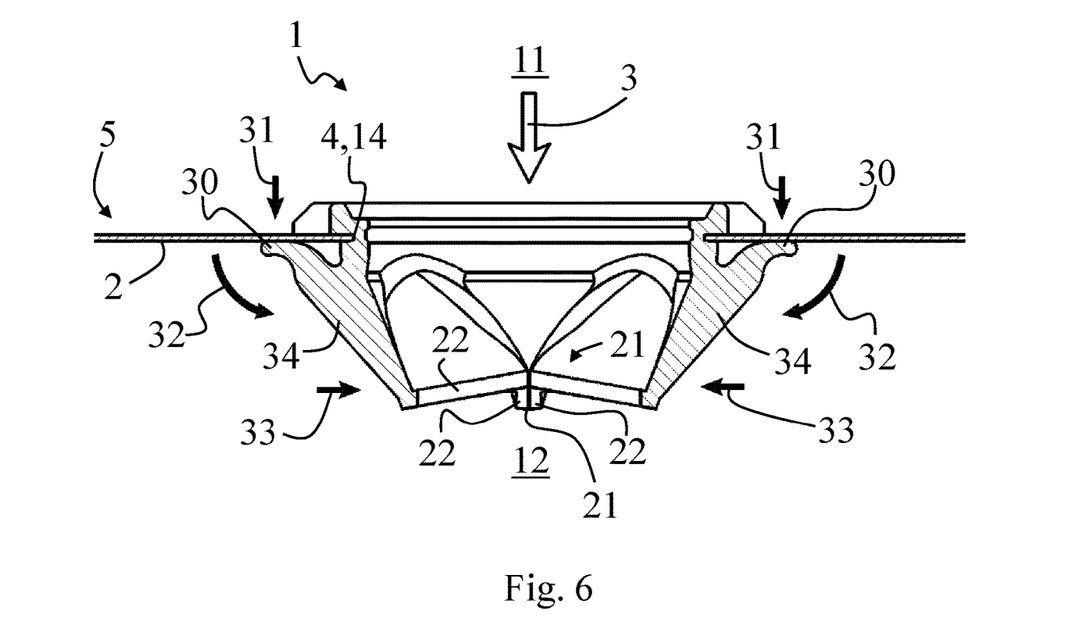
FIG. 6 is a schematic cross-sectional view of the valve shown in FIGS. 1-5, wherein the valve is mounted to a surface such as of a lid.
Figure 7:
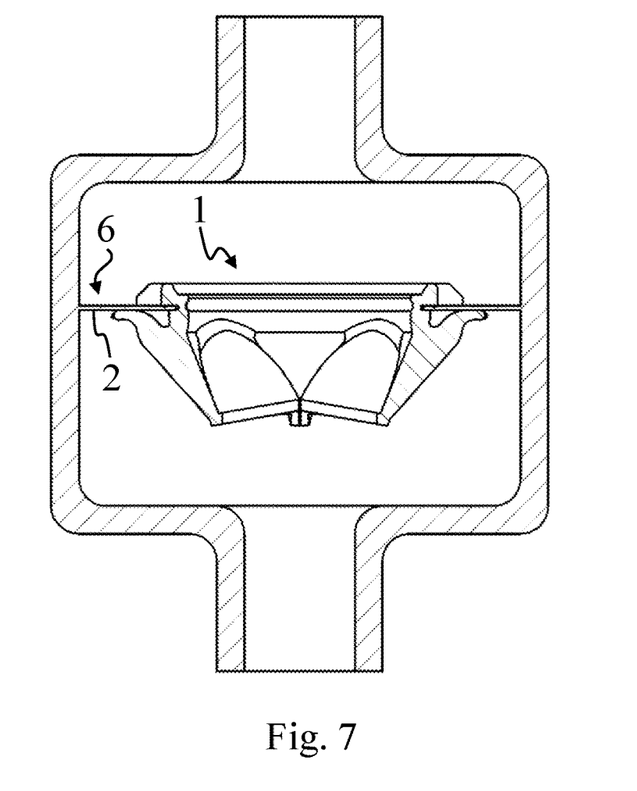
FIG. 7 is a schematic cross-sectional view of the valve shown in FIGS. 1-5, wherein the valve is mounted to a surface inside of a housing.

As apparent from FIGS. 4-6, the valve 1 may comprise a mounting structure 13 for mounting the valve 1 to the surface 2. The mounting structure 13 may be designed to mount the valve 1 to the surface 2 by way of a frictional connection and/or a form fit between the valve 1 and the surface 2. The mounting structure 13 may be designed so as to provide a form and/or a sufficient mounting or fastening force, e.g. a frictional force, for mounting (or attaching or fastening) the valve 1 to the surface 2. For example, the mounting structure 13 may be designed such that the mounting structure 13 can be brought in a state corresponding to the surface 2 the structure comprising the surface 2, wherein by this corresponding state the mounting force is effected, e.g. since the mounting structure 13 is resiliently deformed due to corresponding to the surface 2.

The mounting structure 13 is preferably arranged or designed to comprise a mounting structure plane. The mounting structure plane is a plane, in which the mounting structure 13 extends in order to mount the valve 1 to the surface 2. Therefore, by the design of the mounting structure 13, the mounting structure plane then extends parallel to or in the surface 2. For example, the mounting structure 13 comprises a groove 14 for receiving a side edge of the surface 2, which side edge may define the through hole 4. The groove 14 may be a circumferential groove and/or extend in the mounting structure plane. Preferably, the groove 14 only extends in the mounting structure plane. By receiving the side edge of the surface 2 by the groove 14, the groove widens and thereby a restoring force is effected, which acts on the surface 2 and/or the structure of the surface 2 in order to mount the valve 1 to the surface 2. Therefore, the groove 14 preferably has a width, which in the non-mounted state is less than the thickness of the surface 2, i.e. of the structure which comprises the surface 2.

The mounting structure 13 or the valve 1 may comprise a (mounting) flange 15. The flange 15 may be provided such that the flange 15 can be brought with its (planar) side into a preferably planar contact with the structure, which comprises the surface 2. This (planar) side of the flange 15 preferably contacts a surface of the structure, which is opposite to the surface 2. The flange 15 may also effect or aid in mounting the valve 12 to the surface 2. For example the flange 15 extents circumferentially around the flow path 3 and/or is substantially parallel to the mounting structure plane and/or surface 2. The flange 15 is preferably provided on the inlet side 11 of the valve 1, when the valve 1 is mounted to the surface 2.

The valve 1 may comprise a sealing element for sealing an interface between the valve 1 and the surface 2. As such, the sealing element may sealingly engage the structure, which comprises the surface 2, for sealing said interface.

That is, between the valve 1 and the surface 2 or the side edge of the surface 2, there may be still a small gap, whereas the sealing element fills this gap and therefore effects that the fluid cannot flow through this gap. The mounting structure 13 may comprise the sealing element. The sealing element may be separately provided with the valve 1. The sealing element may be also integrally formed with the valve 1, for example integrally formed with the mounting structure 13, the groove 14, and/or the flange 15. The sealing element may be in the form of an O-ring. Additionally or alternatively, the sealing element may have the form of a lip and/or may be made of a paste (e.g. a sealing paste) and/or may be made by heat sealing. The sealing element is preferably made of an elastically deformable material, which can affect the required sealing force in order to effect the sealing.

The valve 1 comprises one or more ports 21. In the preferred embodiment shown in the figures, the valve 1 comprises only two ports 21. In general, the valve 1 is not limited to a specific number of ports. In other examples, the valve 1 may also comprise only one port 21 or more than two ports. In the following, one of the ports 21 is described. It is to be understood that this description applies likewise to each of the ports 21.

The port 21 is defined by a plurality of lips 22. In the example shown in the figures, the port 21 is defined by only two lips 22. Each of the lips 22 is resiliently deformable from a first position to a second position. The first position, which is a closed position, is exemplarily shown in the figures. In the first position, the valve 1 is in an idle state, i.e. a fluid is not flowing from the inlet side 11 to the outlet side 12 by way of the first direction. As apparent from the figures, in particular from FIG. 2, in the first position the lips 22 are in contact with one another in order to close the respective port 21. This contact is preferably a contact, according to which the lips 22 are engaged with each other. Thus, the lips 22 defining a respective port 21 are provided adjacent each other, both in the first and the second position. In the first position, a force, which is a restoring force of the resiliently deformable lips, effects that the lips 21 contact each other so that a fluid cannot flow through the contacting interface between these lips 22. Thus, the lips 22, i.e. the contacting interface between the lips 22, define a substantially elongate or slit-like form of the port 21 in the first position. As apparent from FIG. 2, the port 21 may thus have the form of a substantially straight line or slit, when viewed in a top view from below, i.e. when viewed in the second direction.

In the second position, which is an opened position of the port 21, the lips 22 are resiliently deformed, thereby opening the port 22 and permitting flow in the first direction. The resilient deformation of the lips 22 in order to open the port 21 may be effected by a pressure on the inlet side 11, which is greater than the pressure on the outlet side 12. This pressure gradient thereby effects that the fluid can flow from the inlet side 11 to the outlet side 12, which is the first direction. The resilient deformation of the lips 22 may be also effected by exerting an external force on the lips 22, which is not due to a pressure gradient, but, for example, due to a mechanical mean acting on the lips 22 (e.g. a control element being controlled by a (electronic) control unit). In the second position, the lips 22 are at least partially not in contact with one another. That is, the lips 22 may still partially contact each other at a contacting interface, whereas the lips 21 are partially distanced from one another in order to open the port for allowing the flow in the first direction.

The lips 22 are not limited to a specific structure as long as they can be (resiliently) moved between the first and the second direction. As exemplarily shown in the figures, each of the lips 22 may extend from the inlet side 11 to the outlet side 12. For example, each of the lips 22 may extend such that a bulge is formed, which bulge preferably bulges from the outlet side 12 to the inlet side 11. Thus, when viewed in a cross-sectional view, each of the lips 22 may extend in an arcuate manner.

As explained above, the preferred embodiment shown in the figures is a valve 1 comprises two ports 21. In general, these ports 21 are not limited to be arranged in a specific manner. A preferred manner of arranging the ports 21 is shown in the figures. As apparent from the figures, the ports 21 may be arranged such that the ports 21 intersect one another, thereby resulting in an arrangement according to a cross-like or star-like manner. The cross-like or star-like manner form of the arrangement of the ports 21 may be defined by each port 21 having a substantially straight elongate or slit-like form. The cross-like or star-like arrangement may be also defined by the ports 21 converging in a center of the cross-like or star-like arrangement. By the plurality of ports 21 (here: two) intersecting one another or converging at the center, the ports 21 therefore form a single port of the valve 1. The valve 1 may be a duckbill valve, which duckbill form may be formed by the one or more ports 21. For example, the valve 1 is a single duckbill valve, which is formed by only one port 21. The valve 1 may also be a double duckbill valve and/or a cross-slit valve. The double duckbill or cross-slit form may be defined by the ports 21 intersecting each other. The valve 1 may also be a cuspic (cuspid) valve. The cuspic form may be defined by accordingly arranging the ports 21 in a star-like manner, for example such that the angle between neighboring ports 21 is substantially identical and/or such that the ports 21 (e.g. three ports) converge at the center of the arrangement of the star-like arrangement.

The valve 1 further comprises one or more contacting structures 30. As apparent from the figures, the valve according to the preferred embodiment comprises only four contacting structures 30. The invention, however, is not restricted to a particular number of contacting structures 30. For example, the valve 1 may comprise a single contacting structure 30 or only two or three contacting structures 30. As particularly apparent from FIGS. 6 and 7, each of the contacting structures 30 is arranged to interfere with and thus mechanically contact the surface 2, when the valve 1 is mounted to the surface 2. A "mechanical contact" is to be understood as a direct contact between the surface 2 and the respective contacting structure 30. The surface 2 may be provided on the outlet side 12 of the valve 1 so that each of the contacting structures 30 mechanically contact the surface 2 on the outlet side 12. However, the surface 2 maybe also provided on the inlet side 11 of the valve 1 so that each of the contacting structures 30 contact the surface 2 on the inlet side 11 of the valve 1. As apparent from FIGS. 6 and 7, the surface 2 and/or the structure comprising the surface 2 may be sandwiched between the flange 15 and the contacting structures 30. The contacting structures 30 do not need to be designed such that they provide a force and/or form in order to aid mounting the valve 1 to the surface 2.

Each of the contacting structures 30 is arranged so that, when the valve 1 is mounted to the surface 2, the mechanical contact of the respective contacting structure 30 with the surface 2 effects that the contacting structures 30 biases the lips 22 into the first position. Therefore, in the first position, not only the restoring force of the resiliently deformable lips 22 effects a force for contacting the lips 22 with one another in order to close the respective port 21 in the first position, but also the contacting structures 30 provide an additional force so that the lips 22 are in contact with one another in order to close the respective port 21; this additional force acts, in particular, at the contacting interface between the lips 22, thereby also bringing the lips 22 in contact with one another. Therefore, even if the restoring force of the resiliently deformable lips 22 is reduced, e.g. due to wear, the additional force effected by the contacting structures 20 still brings the lips 22 in contact with one another to close the port. Leakage by way of the ports 21 in the first position or the idle state of the valve 1, e.g. due to wear, is therefore effectively prevented.

For example, and as apparent from FIG. 6, each of the contacting structures 30 may be arranged such that, when the valve 1 is mounted to the surface 2, each of the contacting structures 30 is pushed against the surface 2. According to this arrangement, a force 31, which acts on the respective contacting structure 30 in response to the respective contacting structure 30 mechanically contacting, i.e. pushing the surface 2, is effected, which is substantially perpendicular to the surface 2 and/or substantially parallel to the flow path 3. The force 31 is then used for biasing the lips 22 into the first position. For example, each of the contacting structures 30 may be arranged such that the respective force 31 acting on the respective contacting structure 30 effects a (mechanical) moment 32 so that this moment 32 in turn effects a closing force 33, which biases the lips 22 into the first position. As such, the additional force at the contacting interface between the lips 22 corresponds to the force 33. The moment 32 particularly depends, amongst others, on the distance between the respective contacting structure 30, on which the force 30 acts, and the position of the valve 1 or the mounting structure 13, which mounts the valve 1 to the surface 2. Thereby, by having a distance between the force 31 acting on the respective contacting structure 30 and the mounting structure 13, a particular advantageous biasing of the lips 22 into the first position can be effected.

Figure 1:
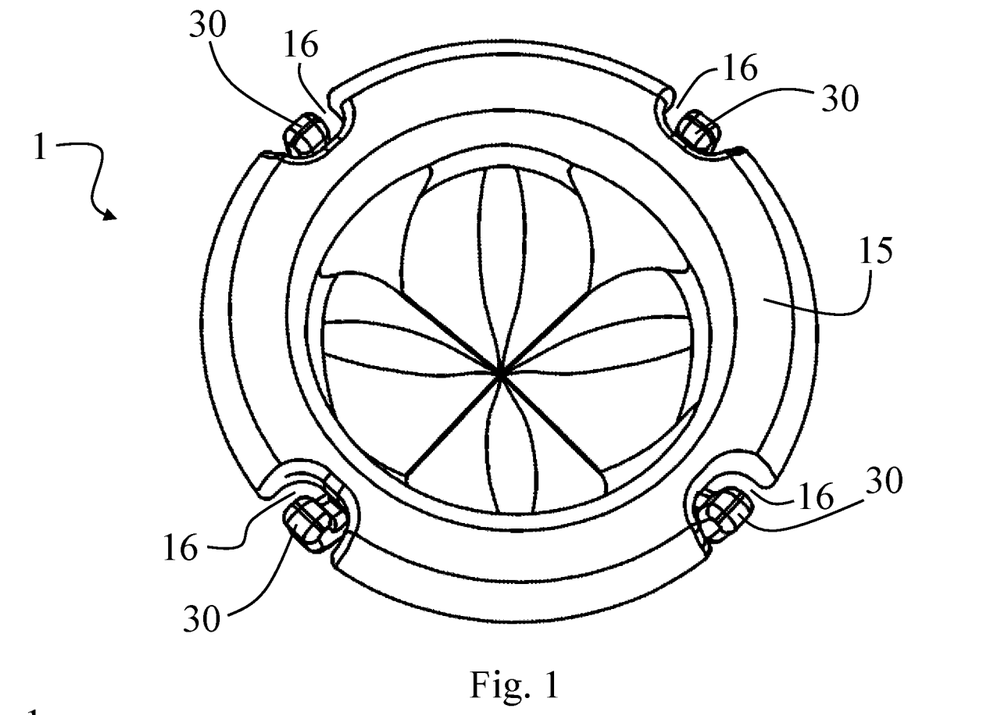
FIG. 1 is a schematic perspective view of a valve according to a preferred embodiment of the invention, wherein the valve is viewed from above, i.e. viewed on an inlet side of the valve.
Figure 2:
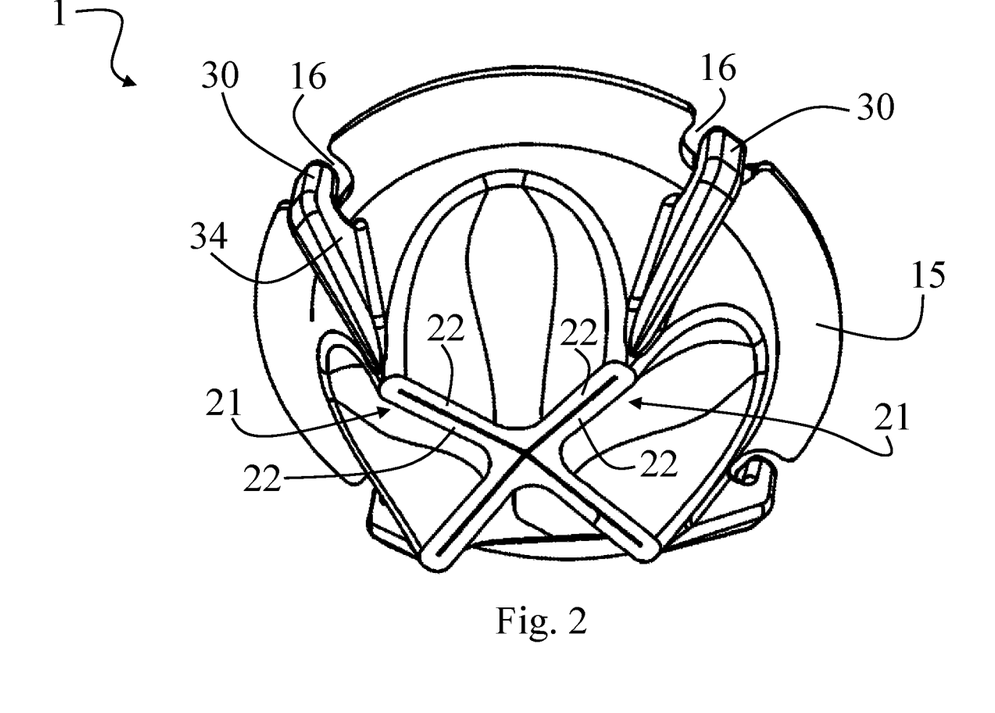
FIG. 2 is a schematic perspective view of the valve shown in FIG. 1, wherein the valve is viewed from below, i.e. viewed on an outlet side of the valve.
Figure 3:
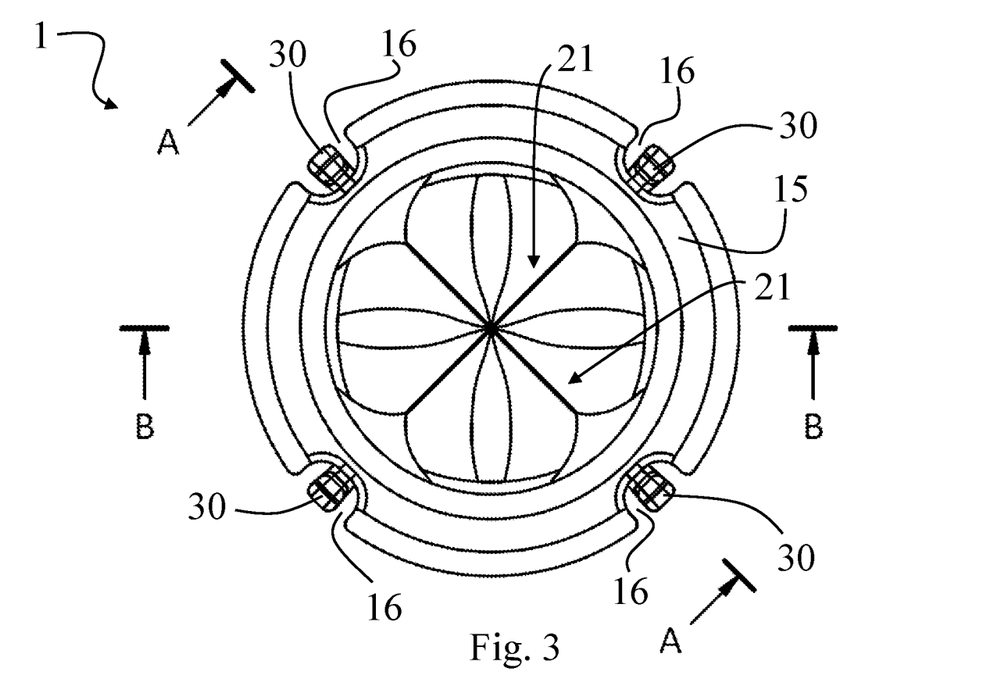
FIG. 3 is a schematic top view of the valve shown in FIGS. 1 and 2.

As apparent from the examples shown in FIGS. 6 and 7, the contacting structures 30 are arranged to be displaced upon mechanically contacting the surface. In these examples, the contacting structures 30 are displaced in a direction away from the mounting structure 13, which in FIGS. 6 and 7 is a direction to the left and right, respectively. As shown in FIG. 2, it is preferred that, when viewed in a direction of the flow path, the contacting structures 30 are arranged such that the contacting structures 30 are displaced in a direction substantially perpendicular with respect to at least one of the ports 21 and/or lips 22. In the example shown in FIG. 2, the displacement direction of two of the contacting structures 30 is substantially perpendicular to one of the ports 21 and the respective lips 22, whereas said displacement direction is substantially parallel to the other one of the ports 21. The displacement direction being substantially perpendicular to the one of the ports 21, i.e. substantially perpendicular with respect to the (longitudinally) extension direction, effects a particularly advantageous biasing of the respective lips 22 into the first position. Similarly, the displacement direction of further two of the contacting structures 30 is substantially perpendicular to the other one of the ports 21 and the respective lips 22, whereas said displacement direction is thus substantially parallel to the one of the ports 21. When the contacting structures 30 are in the displaced position, as shown in FIGS. 7 and 8, at least a part of each of the contacting structures 30, for example at least the distal end part of each of the contacting structures 30, extends parallel to the surface 2.

Figure 8:
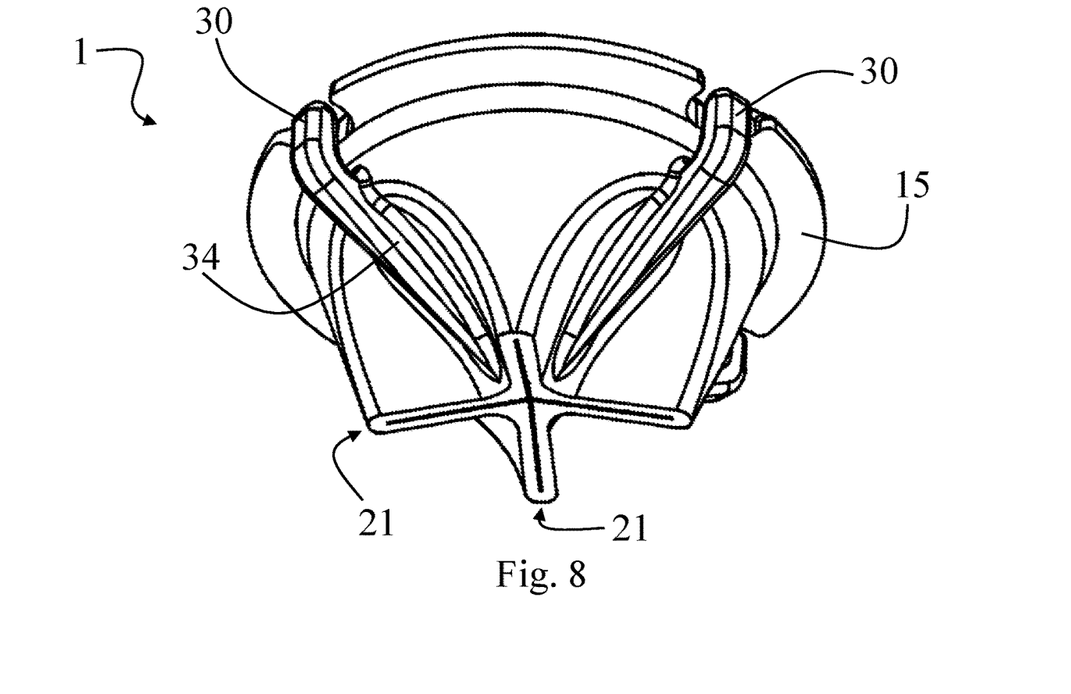
FIG. 8 is a schematic perspective view of an alternative embodiment of the valve according to the invention, wherein the valve is viewed from below, i.e. viewed on an outlet side of the valve.

In an alternative embodiment, which is exemplarily shown in FIG. 8, the contacting structures 30 may be also differently arranged, in particular such that each of the displacement directions of the contacting structures 30 is oriented oblique, instead of substantially perpendicular, with respect to at least one of the ports 21 and/or lips 22. More specifically, in the embodiment shown in FIG. 8, the displacement direction of the two of the contacting structures 30 is oblique to both the one of the ports 21 (and the respective lips 22) and the other one of the ports 21 (and the respective lips). Similarly, the displacement direction of the further two of the contacting structures 30 is oblique to both the one of the ports 21 (and the respective lips 22) and the other one of the ports 21 (and the respective lips).

The contacting structures 30 may be arranged around the flow path 3 and/or the axis or symmetrical axis of the valve 1. For example, the contacting structures 30 may be arranged such that the contacting structures 30 are evenly distributed around the flow path 3 and/or the (symmetrical) axis of the valve 1. For example, the contacting structures 30 may be arranged such that each of the ports 21 has a respective (dedicated) number of contacting structures 30, for example a pair of contacting structures 30, as shown in the figures. The contacting structures 30 of this pair may be provided opposite to one another (with the axis of the valve 1 being between these contacting structures) and/or on the same straight-line, as shown, in particular, in FIG. 6. As such, both of these contacting structures 30 bias the lips 22 of the corresponding one of the ports 21 into the first position. In other words, the additional forces effected by the contacting structures 30 provided for a particular port 21 are all accumulated at the contacting interface between the lips 22 of this port 21. Thus, a particularly advantageous contacting of these lips 22 with one another in order to close the respective port 21 is achieved.

The contacting structures 30 are not limited to a particular structure as long as the contacting structures 30 can facilitate a mechanical contact with the surface 2 in order to bias the lips 22 into the first position. In the preferred embodiment shown in the figures, in particular as apparent from FIGS. 6 and 7, the contacting structures 30 are resiliently deformable. As such, the contacting structures 30 are deformed upon mechanically contacting the surface 2 in order to bias the lips 22 into the first position. The deformation of the contacting structures 30 thus effects a restoring force, which acts on the respective contacting structure 30. This restoring force then corresponds to the force 31. By having the contacting structures 30 being resiliently deformable, the biasing of the lips 22 into the first position can thus be easily achieved.

As exemplarily shown in the figures, each of the contacting structures 30 may be provided as a protrusion or a pin. The extending direction of each of the protrusions or pins or contacting structures 30 is, in the non-mounted state of the valve 1, preferably substantially parallel to the flow path 3 and/or (symmetrical) axis of the valve 1. Each of the contacting structures 30 is preferably distanced from at least part of the mounting structure 13, such as the groove 14. Each of the contacting structures 30 may extend beyond the mounting structure 13, preferably beyond the mounting structure plane of the mounting structure 13. Thereby, the contacting structures 30 can be displaced along a relatively long way, thereby effecting a particularly advantageous biasing of the lips 22 into the first position, while still having a compact valve 1. The flange 15 may comprise one or more recesses 16, which are arranged correspondingly to the arrangement of the contacting structures 30. When the valve 1 is in the non-mounted state, each of the contacting structures 30 may then extent into a corresponding one of the recesses 16, as apparent from, for example, FIG. 5. Thus, a very compact design of the valve 1 is achieved, which furthermore can be easily manufactured, e.g. in a molding process.

Each of the contacting structures 30 may extent from a respective rib 34. The rib 34 reinforces the connection between the respective contacting structure 30 and the respective lip 22 so that the respective contacting structure 30 can effectively transfer a force and/or moment from the contacting structure 30 to the respective lips 22 in order to bias the lips 22 into the first position. When viewed in the direction of the flow path 3 or of the (symmetrical) axis of the valve 1, the extending direction of the rip 34 preferably corresponds to the displacement direction of the respective contacting structure 30. The rib 34 may extend from the conjunction, at which the (pair of) lips 22 of a respective port 21 merge, to the respective contacting structure 30. In the embodiment shown in FIG. 8, each of the ribs 34 preferably extends between two neighboring ports 21, when viewed from the outlet side 12 or in the second direction.

The valve 1 is not restricted to a particular material. For example, the valve 1 is made of a deformable and/or elastic material. Preferably, the valve 1 is made of, rubber or silicone. The valve 1 may be made of Ethylene-Propylene Diene Monomer (EPDM), and/or a fluoroelastomeric material such as FPM (FKM) and/or FFPM (FFKM). The valve 1 may be composed of multiple parts, which can be provided separately to one another. Preferably, the valve 1 consists of only one part, i.e. has a monolithic structure. For example, at least the one or more ports 21, defined by the plurality of lips 22, and the one or more contacting structures 30 are integrally formed with one another.

It should be clear to a skilled person that the embodiments shown in the figures are only a preferred embodiments, but that, however, also other designs of a valve can be used.

The invention claimed is:

1. A valve (1) for mounting to a surface (2) and for use in a flow path, which flows through said surface (2), for permitting flow in said flow path in a first direction and for preventing flow in said flow path in a second direction being opposite to the first direction, wherein the valve (1) comprises:
   one or more ports (21) defined by a plurality of lips (22), wherein each lip (22) is resiliently deformable from a first position, in which the lips (22) are in contact with one another in order to close the respective port (21), to a second position, in which the respective port (21) is opened in order to permit flow in the first direction, and
   one or more contacting structures (30) arranged to mechanically contact the surface (2), when the valve is mounted to the surface (2), such that the one or more contacting structures (30) bias the lips (22) into the first position
   wherein the surface (2) is a substantially flat surface,
   wherein the valve (1) comprises a mounting structure (13) for mounting the valve (1) to the surface (2),
   wherein the one or more contacting structures (30) are arranged to be displaced in a direction away from the mounting structure (13) upon mechanically contacting the surface (2), and
   wherein the mounting structure (13) comprises a groove (14) for receiving a side edge (4) of the surface (2).

2. The valve (1) according to claim 1, wherein the surface (2) is a surface of a support plate or a lid (5) or a separating plate (6).

3. The valve (1) according to claim 1, wherein the one or more contacting structures (30) are arranged such that a force (31), which acts on the one or more contacting structures (30) in response to the one or more contacting structures (30) mechanically contacting the surface (2), is substantially perpendicular to the surface (2) and/or substantially parallel to the flow path.

4. The valve (1) according to claim 1 wherein the one or more contacting structures (30) are arranged around the flow path.

5. The valve (1) according to claim 4, wherein the one or more contacting structures (30) are evenly distributed around the flow path.

6. The valve (1) according to claim 1, wherein the one or more contacting structures (30) are resiliently deformable such that they are deformed upon mechanically contacting the surface (2) in order to bias the lips into the first position.

7. The valve (1) according to claim 1, wherein at least one of the one or more contacting structures (30) is a protrusion.

8. The valve (1) according to claim 1, wherein the valve (1) comprises a a flange (15) designed to be brought into contact with the surface (2) when the valve (1) is mounted to the surface (2).

9. The valve (1) according to claim 8, wherein the valve (1) comprises a sealing element for sealing an interface between the valve (1) and the surface (2).

10. The valve (1) according to claim 9, wherein the mounting structure (13) comprises the sealing element.

11. The valve (1) according to claim 8, wherein the flange (15) is designed to be brought into planar contact with the surface (2) when the valve (1) is mounted to the surface (2).

12. The valve (1) according to claim 1, wherein the valve (1) is made of a deformable and/or elastic material.

13. The valve (1) according to claim 1, wherein at least one of the one or more ports (21) has a substantially elongate or slit-like form, and/or wherein the ports (21) intersect one another and/or are arranged in a substantially cross-like or star-like manner.

14. The valve (1) according to claim 1, wherein the valve (1) is a duckbill valve, a double duckbill valve, a cross-slit valve and/or a cuspic valve.

15. Supporting structure comprising a surface (2) and a valve (1) according to claim 1, wherein the valve (1) is mounted to the surface (2) for being used in a flow path, which flows through said surface (2), wherein the one or more contacting structures (30) of the valve (1) mechanically contact the surface (2) such that the one or more contacting structures (30) bias the lips (21) into the first position.

16. The support structure according to claim 15, wherein the support structure comprises a lid (5).

17. The valve (1) according to claim 1, wherein the one or more contacting structures (30) are arranged to be displaced upon mechanically contacting the surface (2) such that, when viewed in the direction of the flow path, the one or more contacting structures (30) are displaced in a direction substantially perpendicular or oblique with respect to at least one of the ports (21) and/or lips (22).

18. The valve (1) according to claim 1, wherein the mounting structure (13) is arranged for mounting the valve (1) to the surface (2) such that a mounting structure plane, in which the mounting structure extends (13), extends in the surface (2), wherein, when the valve (1) is not mounted to the surface (2), the one or more contacting structures (30) extend beyond the mounting structure plane.

* * * * *